UNITED STATES PATENT OFFICE 2,566,228

PRODUCTION OF MELAMINE

Johnstone S. Mackay, Old Greenwich, Conn., assignor to American Cyanamid Company, New York, N. Y., a corporation of Maine No Drawing. Application June 14, 1949, Serial No. 99,132

2 Claims. (Cl. 260—249.7)

The present invention relates to the preparation of melamine using urea as a starting reactant.

The processes of obtaining melamine from urea in the prior art necessitated the use of equipment capable of withstanding superatmospheric pressure. A method of obtaining melamine from urea at atmospheric pressure has now been discovered.

It is an object of this invention to prepare melamine by reacting urea and ammonium sulfamate at atmospheric pressure.

Additional objects will be evident from the description of the invention hereinafter.

In general, the reactants are simply fused at a temperature of at least 250° C. and the resulting reaction mass leached with a melamine solvent, such as hot water. Melamine may then be crystallized from the filtrate. At higher temperatures, e. g., 300° C. and higher, the vapor pressure of melamine is appreciable and it may be recovered by continuously sweeping the reaction zone with an inert gas, such as ammonia, cooling the vapors to precipitate melamine dust, and recovering the dust in a cyclone dust collector or the like.

The proportions of the reactants may vary widely but the preferred ratio is approximately that given in the following example. This example is intended to illustrate without limiting the invention.

Example

Urea (60 g., 1.00 mol) and ammonium sulfamate (228 g., 2.00 mol) were mixed in a 600 cc. tall form beaker. The beaker was placed in a Wood's metal bath and heated to 315° C. The contents of the beaker were maintained at 315° C. for 0.25 hour. The reaction product was cooled and slurried at room temperature with 300 ml. water. The slurry was filtered and the filter cake washed with an additional quantity of water. Combined volume of filtrate and wash, 518 ml. Dry weight of filter cake, 4.96 g.

On analysis the filter cake was found to contain 68.0 weight per cent melamine, equivalent to 3.38 g. or 0.0268 mol melamine. The combined filtrate plus wash was found to contain 0.23 weight per cent melamine, equivalent to 1.19 or 0.0095 mol melamine. The combined melamine was therefore 3.38+1.19 or 4.57 g., or 10.9% of theoretical.

As above stated, 250° C. is the lower operable limit for the formation of melamine by this process. If the reaction is conducted in an open vessel, the upper temperature limit for practicable purposes is the melting point of melamine, about 354° C. In using a closed system (but at atmospheric pressure) and sweeping out melamine as the vapor by means of ammonia or other inert gas, higher temperatures, up to 400° C., may be employed. However, the preferred temperature range is 285°–340° C.

While the invention has been described with particular reference to specific embodiments, it is to be understood that it is not to be limited thereto but is to be construed broadly and restricted solely by the scope of the appended claims.

I claim:

1. The method of making melamine comprising heating urea and ammonium sulfamate at a temperature greater than 300° but not exceeding 400° C. at substantially atmospheric pressure and separating the thus-formed melamine from the reaction mass.

2. The method according to claim 1 in which the urea: ammonium sulfamate mol ratio is 1:2 and the temperature is greater than 300° but not exceeding 340° C.

JOHNSTONE S. MACKAY.

REFERENCES CITED

The following references are of record in the file of this patent:

UNITED STATES PATENTS

| Number | Name | Date |
| --- | --- | --- |
| 2,212,152 | Cupery | Aug. 20, 1940 |
| 2,262,935 | Hill | Nov. 18, 1941 |
| 2,464,247 | Mackay | Mar. 15, 1949 |

FOREIGN PATENTS

| Number | Country | Date |
| --- | --- | --- |
| 933,241 | France | Dec. 17, 1947 |
| 598,175 | Great Britain | Feb. 12, 1948 |